N. F. TILLERY.
SELF CLEANING OIL GAGE.
APPLICATION FILED MAR. 26, 1918.
1,276,831.
Patented Aug. 27, 1918.
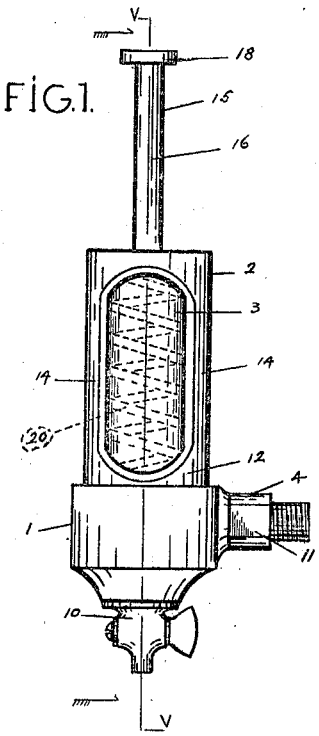
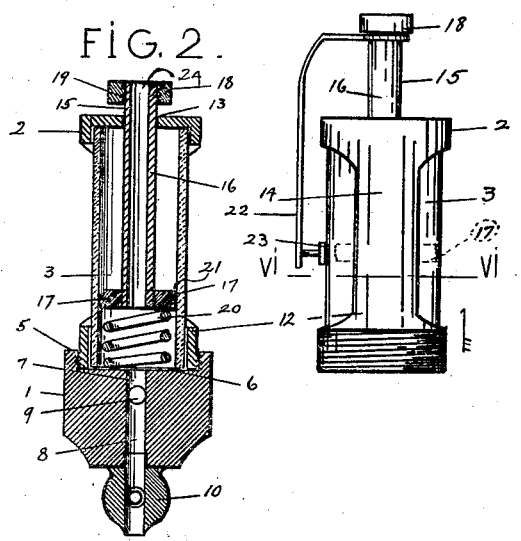
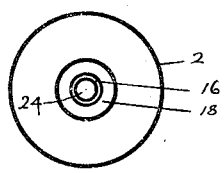
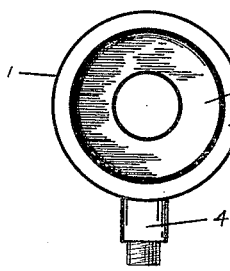
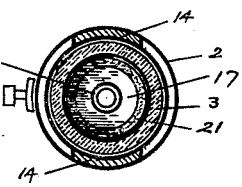
WITNESS:
F. E. Kenney
F. E. Small
INVENTOR.
Noah F. Tillery
BY
M. C. Gilham
ATTORNEY.

UNITED STATES PATENT OFFICE.

NOAH F. TILLERY, OF HUMANSVILLE, MISSOURI.

SELF-CLEANING OIL-GAGE.

1,276,831.  Specification of Letters Patent. Patented Aug. 27, 1918.

Application filed March 26, 1918. Serial No. 224,724.

*To all whom it may concern:*

Be it known that I, NOAH F. TILLERY, a citizen of the United States, residing at Humansville, in the county of Polk and State of Missouri, have invented a new and useful Self-Cleaning Oil-Gage, of which the following is a specification.

My invention relates to self-cleaning oil gages, which are employed in connection with inclosed machine bearings and casings to indicate the presence of lubricating oil.

It is known that oil gages are frequently inoperative through the stoppage of the communicating passages by dirt, impurities, and sediment incident to waste involved in lubricated bearings. In such a case, the oil in the gage remains stationary and indicates oil in the bearings, regardless of dry bearings.

The object of my invention is to provide a cheap, durable and dependable oil gage and provided with facility for self-cleaning, so that the gage shall indicate the true levels of the oil in the bearing casing.

I attain this object by means of the mechanism illustrated in the accompanying drawing in which—

Figure 1, is an elevation of an oil gage embodying my invention; Fig. 2, is a sectional view of the same, taken on the line V—V in Fig. 1; Fig. 3, is an elevation of the holder member of the gage, and showing the outer cleaning attachment combined with the plunger, a part of my invention; Fig. 4, is a top view of the holder member, and showing the vent orifice in the plunger rod; Fig. 5, is a top view of the supporting member, and showing the seat to receive the glass gage tube and the compression spring; Fig. 6, is a cross section through the holder member and gage tube, taken on the line VI—VI, in Fig. 3.

Similar numerals of reference refer to corresponding parts throughout the several views.

The gage I have invented consists of the supporting member 1, the holder member 2, and the glass tube 3, and which, combined with the mechanism hereafter described, forms my invention. The supporting member and likewise the holder member, is preferably made of brass. The supporting member combines an integral nipple 4, having screw threads on its end portion adapted for a screw connection with a bearing casing, not shown. The upper portion of the supporting member is bored out adjacent to the plane of the passage-way in the nipple to form a cup portion 5, having a diameter adapted to receive the lower end portion of the holder member, and the cup portion is provided with internal screw threads. A hole 6, is bored centrally downwardly through the bottom of the cup and continuing entirely through the member, in such a manner that it communicates with the passage-way in the nipple, thereby forming an inlet passage-way 7, to the gage and an outlet 8, the latter being provided with internal screw threads adapted to receive the screw end of a pet-cock 10, which serves to drain the passage-ways 7 and 8, and likewise passage way 9, in the nipple. The opposite sides of the nipple are formed flat in vertical direction and adapted for receiving the jaws of a monkey-wrench, as shown at 11, in Fig. 1. The upper and lower end portions of the holder are formed cylindrical, the lower portion 12, is tubular and provided with external screw threads adapted to engage the internal threads in the upper portion of the member 1, to seat the holder on the bottom of the cup portion 5. The upper end portion of the holder is formed like a cap, through the top of which a hole 13, is apertured, to substantially register with the inner end of passage way 7, in member 1. Ribs 14, are formed integral with the upper and lower portions of the holder 2, and extend vertically of the latter. The inner sides of the ribs are formed concave and the outer sides thereof are convexed, as is shown in Fig. 6. The tube 3, is made of glass and very transparent, so that the oil in the tube may be readily seen. The tube is removably lodged in the holder and, when the parts are operatively assembled and the gage organized, the lower edge of the tube will be seated on the bottom of the cup portion 5, and its upper end will bear on the inner side of the cap portion of the holder 2, the tube then communicating with the passage ways 7, 8 and 9. A plunger 15, comprising a tubular rod 16, and a piston 17, integral therewith, at its lower end and a detachable button 18, which is screwed on its upper end, as shown at 19, in Fig. 2, is inserted in the tube 3, so that the rod 16, shall pass through the hole 13, in the holder, and extend thereabove a suitable distance. A compression spring, preferably a coiled spring or spiral spring 20, is arranged in the tube, below the piston 17, to normally hold the plunger in an elevated position, as shown in Fig. 1. A liner or packing 21, made of felt, leather, rubber, or other suitable material, preferably felt, is mounted on the periphery of the piston, in such a manner that it shall impinge upon the inner side of the tube. A cleaner 22, is mounted on the upper portion of the plunger rod and bowed downwardly and bent to lie parallel with the tube 3. A brush 23, is attached to the lower end of the leg of the cleaner attachment and made to impinge on the tube, the said leg being made of spring metal, the brush is held firmly on the tube by the tensioning of the leg. A cushion of rubber or washer may be placed on the bottom of the cup portion of the member 1, to prevent seepage of oil and to prevent fracture of the glass tube.

The gage, organized as I have described, operates as follows: The oil in the casing supplies the gage glass with oil, in the well known manner. The plunger is pressed downwardly against the spring resistance of the spring 20, and in this action, the finger of the hand is placed firmly over the vent 24, at the top of the plunger rod. The piston acts to force the oil to flow back into the casing thereby disturbing the deposits of obstructive matter lodged in the passages 7 and 9. When the plunger is released, the reaction of the spring 20, which at this time is at maximum tension, forces the plunger back to normal position, at the same time the oil is drawn from the casing into the gage. Repeated operations of the plunger will effect a cleaning of the passages and dislodge obstructive materials therein. After these operations the matter may be drawn off through the pet-cock in the usual manner. At the time the plunger is operated to clean out the passages, the felt ring on the piston in contact with the tube, effects a cleaning of the interior wall thereof. At the same time, the brush 23, is carried by the plunger up and down the outer side of the tube, effecting a cleaning of its exterior. The simultaneous cleaning of the passages and tube assures greater visibility and reliable gage indications.

Having described my invention what I claim is—

1. A self-cleaning oil gage, consisting of a supporting member, a holder member detachably secured on said supporting member, a transparent tube arranged in said holder and seated in said supporting member, a plunger having a piston on its lower end provided with a pliable packing ring fitted in said tube and adapted to slide therein, and a spring arranged in said tube and adapted to hold said plunger normally elevated.

2. A self-cleaning oil gage, consisting of a supporting member, a holder member detachably secured on said supporting member, a transparent tube arranged in said holder and seated in said supporting member, a plunger having a piston on its lower end provided with a pliable packing ring fitted in said tube and adapted to slide therein, a spring arranged in said tube and adapted to hold said plunger normally elevated, and a brush carried by said plunger and slidably engaging the exterior side of said tube.

3. In an oil gage having a transparent indicating tube, the combination of a plunger movably arranged in the tube, said plunger comprising a piston having a ring of yielding material secured on its peripheral face and in engagement with the inner side of the tube and a rod extending upwardly from said piston through and beyond the upper end of the gage, said rod having a vent communicating with the tube below the piston, and a spring arranged in the tube and adapted to hold said plunger normally elevated.

4. In an oil gage having a transparent indicating tube, the combination of a plunger movably arranged in the tube, said plunger comprising a piston having a ring of yielding material secured on its peripheral face and in engagement with the inner side of the tube and a rod extending upwardly from said piston through and beyond the upper end of the gage, said rod having a vent communicating with the tube below the piston, a spring arranged in the tube and adapted to hold said plunger normally elevated, and a brush carried by said plunger and slidably engaging the outer side of the tube.

Kansas City, Missouri, March 19, 1918.

NOAH F. TILLERY.

Witnesses:
JOHN C. STEARNS,
F. E. KENNEY.

Copies of this patent may be obtained for five cents each, by addressing the "Commissioner of Patents, Washington, D. C."